(12) United States Patent
Jha et al.

(10) Patent No.: US 11,347,518 B2
(45) Date of Patent: May 31, 2022

(54) SYSTEM AND METHOD FOR ADAPTIVELY SAMPLING APPLICATION PROGRAMMING INTERFACE EXECUTION TRACES BASED ON CLUSTERING

(71) Applicant: VMWARE, INC., Palo Alto, CA (US)

(72) Inventors: Ritesh Jha, Bangalore (IN); Soumya Panigrahi, Bangalore (IN); Mageshwaran Rajendran, Bangalore (IN); Susobhit Panigrahi, Bangalore (IN); Narayanasamy Ramesh, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/566,916

(22) Filed: Sep. 11, 2019

(65) Prior Publication Data

US 2021/0026646 A1   Jan. 28, 2021

(30) Foreign Application Priority Data

Jul. 24, 2019   (IN) .............................. 201941029838

(51) Int. Cl.
    *G06F 9/38*     (2018.01)
    *G06F 9/54*     (2006.01)
    *G06F 9/30*     (2018.01)
    *G06F 17/11*    (2006.01)

(52) U.S. Cl.
    CPC ........ *G06F 9/3891* (2013.01); *G06F 9/30036* (2013.01); *G06F 9/3808* (2013.01); *G06F 9/541* (2013.01); *G06F 17/11* (2013.01)

(58) Field of Classification Search
    CPC .. G06F 9/3891; G06F 9/30036; G06F 9/3808; G06F 9/541; G06F 17/11
    See application file for complete search history.

(56) References Cited

U.S. PATENT DOCUMENTS

| 9,626,275 | B1 * | 4/2017 | Hitchcock | ........... G06F 11/3093 |
| 2005/0091646 | A1 * | 4/2005 | Chilimbi | ................. G06F 8/30 717/130 |
| 2013/0339931 | A1 * | 12/2013 | Rode | .................... G06F 11/3664 717/128 |

(Continued)

OTHER PUBLICATIONS

Pirzadeh et al, "Stratified sampling of execution traces: Execution phases serving as strata", [Online], 2013, pp. 1099-1118, [Retrieved from internet on Jan. 13, 2022], <https://pdf.sciencedirectassets.com/271600/1-s2.0-S0167642313X00061/1-s2.0-S0167642312002080/main.pdf?> (Year: 2013).*

(Continued)

*Primary Examiner* — S. Sough
*Assistant Examiner* — Zengpu Wei
(74) *Attorney, Agent, or Firm* — Loza & Loza, LLP

(57) ABSTRACT

A system and method for sampling application programming interface (API) execution traces in a computer system uses feature vectors of the API execution traces that are generated using trace-context information. The feature vectors are then used to group the API execution traces into clusters. For the cluster, sampling rates are generated so that a sampling rate is assigned to each of the clusters. The sampling rates are then applied to the API execution traces to adaptively sample the API execution traces based on the clusters to which the API execution traces belong.

20 Claims, 8 Drawing Sheets

(56) References Cited

U.S. PATENT DOCUMENTS

| | | | | |
|---|---|---|---|---|
| 2018/0211001 A1* | 7/2018 | Gopalan | ................ | G16B 30/00 |
| 2019/0303584 A1* | 10/2019 | Yang | ..................... | G06F 21/577 |
| 2019/0340059 A1* | 11/2019 | Bagarolo | ............ | G06F 11/0772 |
| 2020/0012789 A1* | 1/2020 | Usui | ................... | H04L 63/1433 |
| 2020/0206920 A1* | 7/2020 | Ma | ...................... | G06F 11/3438 |

OTHER PUBLICATIONS

Jaeger, "Sampling", https://www.jaegertracing.io/docs/1.8/sampling/, retrieved Jul. 20, 2020, 3 pgs.
Github, "Adaptive Sampling", #365, https://github.com/jaegertracing/jaeger/issues/365, retrieved Jul. 20, 2020, 17 pgs.
"Microservice architecture", https://microservices.io/, retrieved Jun. 24, 2020, 13 pgs.
Sigelman, Benjamin H. "Dapper, a largescale distributed systems tracing infrastructure", Google Technical Report dapper-2010-1, Oct. 2010, 14 pgs.
Zipkin, "Zipkin", https://zipkin.io/, retrieved Jun. 24, 2020, 4 pgs.
Jaeger, "Open source, end-to-end distributed tracing", https://www.jaegertracing.io, retrieved Jun. 24, 2020, 10 pgs.
W3C, "Trace Context", https://www.w3.org/TR/trace-context/#trace-context-http-headers-format, Feb. 6, 2020, 29 pgs.
Opentracing, "What is Distributed Tracing?" https://opentracing.io/docs/overview/what-is-tracing/#who-uses-distributed-tracing, retrieved Jun. 26, 2020, 2 pgs.
W3C, "Trace-context specification", https://www.w3.org/TR/trace-context/#trace-context-http-headers-format, retrieved Jun. 24, 2020, 1 pg.
Apache Kafka, "Documentation; kafka 2.5 documentation", https://kafka.apache.org/documentation/, retrieved Jun. 24, 2020, 240 pgs.
Confluent, "Confluent Platform Documentation", retrieved Jun. 24, 2020, 240 pgs.
Wikipedia, "Cluster Analysis", https://en.wikipedia.org/wiki/Cluster_analysis, retrireved Jun. 24, 2020, 21 pgs.
Wikipedia, "DBSCAN", https://en.wikipedia.org/wiki/DBSCAN, retrieved Jun. 24, 2020, 8 pgs.
Ester, Martin et al. "A density-based algorithm for discovering clusters a density-based algorithm for discovering clusters in large spatial databases with noise.", In Proceedings of the Second International Conference on Knowledge Discovery and Data Mining, KDD'96, AAAI Press, 1996, pp. 226-231.

* cited by examiner

| Operation Method | Operation Path | Service Name | Span-1 Hostname | Span-1 Duration | Span-1 Status Code | Span-2 Hostname | ... |

SYSTEM AND METHOD FOR ADAPTIVELY SAMPLING APPLICATION PROGRAMMING INTERFACE EXECUTION TRACES BASED ON CLUSTERING

RELATED APPLICATIONS

Benefit is claimed under 35 U.S.C. 119(a)-(d) to Foreign Application Serial No. 201941029838 filed in India entitled "SYSTEM AND METHOD FOR ADAPTIVELY SAMPLING APPLICATION PROGRAMMING INTERFACE EXECUTION TRACES BASED ON CLUSTERING", on Jul. 24, 2019, by VMWare, Inc., which is herein incorporated in its entirety by reference for all purposes.

BACKGROUND

With the advent of distributed systems and microservices based architecture, end-to-end execution-based dynamic application programming interface (API) tracing systems have become an important tool for effective diagnosis of API failures and performance issues. Unlike logging and monitoring, these execution-based dynamic API tracing systems allow capturing of end-to-end spans for various API requests.

However, current implementations of execution-based dynamic API tracing systems capture only a subset of API execution traces to manage storage and scale constraints effectively. Most of the popular Google's Dapper based tracing implementations, such as Twitter's Zipkin and Uber's Jaeger, use a trace sampling strategy which randomly samples only 1-5% of the API execution traces. Since in general, the population of successful API calls is very large compared to the unsuccessful and/or unusual API calls, the distribution of randomly sampled set is heavily skewed towards the normal and consistent API execution traces, which results in missing out on unusual API execution traces that are required for the purposes of effective diagnosis of API failures and performance issues.

SUMMARY

A system and method for sampling application programming interface (API) execution traces uses feature vectors of the API execution traces that are generated using trace-context information. The feature vectors are then used to group the API execution traces into clusters. For the cluster, sampling rates are generated so that a sampling rate is assigned to each of the clusters. The sampling rates are then applied to the API execution traces to adaptively sample the API execution traces based on the clusters to which the API execution traces belong.

A computer-implemented method for sampling API execution traces in accordance with an embodiment of the invention comprises generating the API execution traces using API-related events published from microservices in response to execution of API requests, generating feature vectors of the API execution traces using trace-context information, grouping the API execution traces into clusters using the feature vectors of the API execution traces, computing sampling rates for the clusters of API execution traces so that a sampling rate is assigned to each of the clusters, adaptively sampling the API execution traces using the sampling rates based on the clusters to which the API execution traces belong, and storing the API execution traces that have been sampled in a storage. In some embodiments, the steps of this method are performed when program instructions contained in a non-transitory computer-readable storage medium are executed by one or more processors.

A system in accordance with an embodiment of the invention comprises memory and at least one processor configured to generate API execution traces using API-related events published from microservices in response to execution of API requests, generate feature vectors of the API execution traces using trace-context information, group the API execution traces into clusters using the feature vectors of the API execution traces, compute sampling rates for the clusters of API execution traces so that a sampling rate is assigned to each of the clusters, adaptively sample the API execution traces using the sampling rates based on the clusters to which the API execution traces belong, and store the API execution traces that have been sampled in a storage.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 4 is a trace feature vector for an API execution trace in accordance with an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
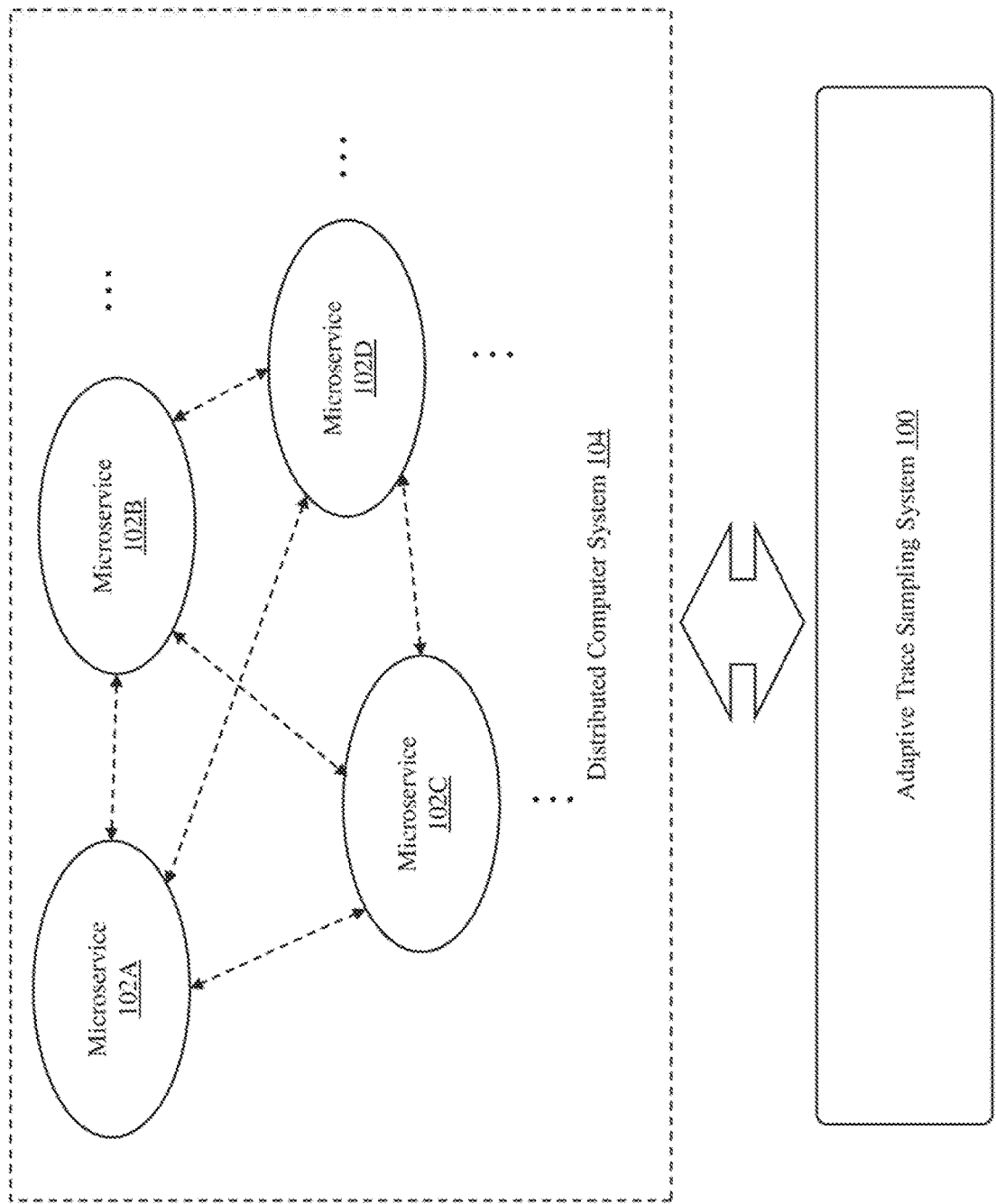
FIG. 1 is a block diagram of an adaptive trace sampling system and microservices running in a distributed computer system in accordance with an embodiment of the invention.

FIG. 1 shows an adaptive trace sampling system 100 for adaptively sampling application programming interface (API) execution traces through microservices 102 (i.e., 102A, 102B, 102C, 102D . . . ) running in a distributed computer system 104 in accordance with an embodiment of the invention. As explained in more detail below, the adaptive trace sampling system 100 receives API-related events from the microservices 102 running the distributed computer system 104, which are used to generate API execution traces. Rather than randomly sampling the API execution traces that typically capture normal and consistent API execution traces, the adaptive trace sampling system 100 selectively samples the API execution traces based on clustering to capture more interesting API execution traces, e.g., unsuccessful and/or unusual API execution traces. Thus, the sampled API execution traces will be more useful for evaluating and analyzing API failures and performance issues.

The distributed computer system 104 allows microservices-based applications to be executed using one or more of the microservices 102 running in the distributed computer system. These microservices-based applications can be any application that can run on any physical infrastructure and perform one or more operations or processes. As an example, a microservices-based application executed in the distributed compute system 104 may be an e-commerce application that takes customer orders and payment details and ships the ordered items to the customers. The microservices 102 that execute the microservices-based applications may execute various tasks related to API calls in certain sequences. The microservices 102 are separate computer programs, which may include one or more processing routines to execute the various tasks to execute APIs. In an embodiment, the microservices 102 are configured or programmed with 100% sampling rate to publish all API-related events to the adaptive trace sampling system 100. The publishing of API-related events can be done asynchronously to minimize performance overhead.

Figure 2:
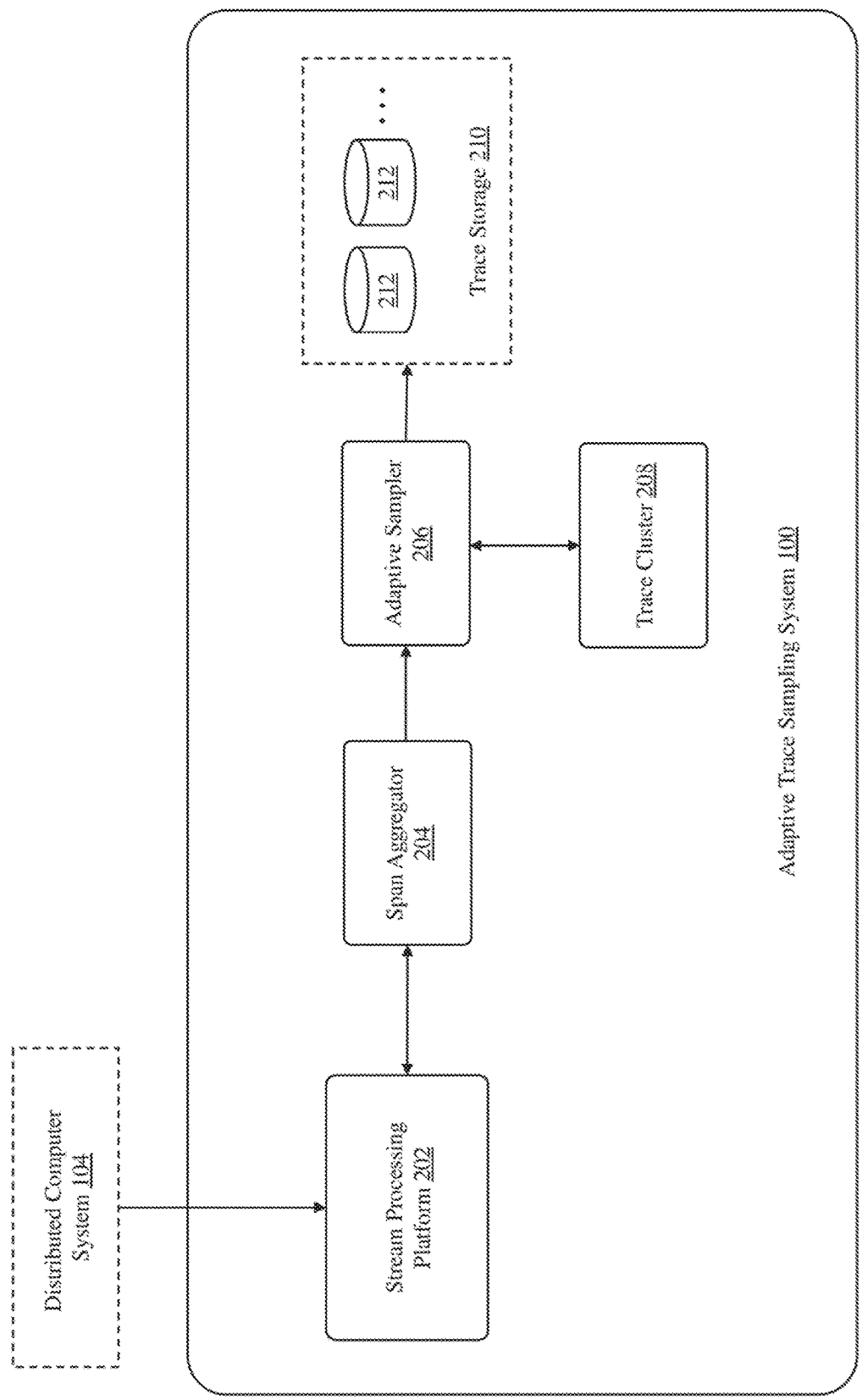
FIG. 2 is a block diagram of components of the adaptive trace sampling system in accordance with an embodiment of the invention.

Turning now to FIG. 2, components of the adaptive trace sampling system 100 in accordance with an embodiment of the invention are illustrated. As shown in FIG. 2, the adaptive trace sampling system 100 includes a stream processing platform 202, a span aggregator 204, an adaptive sampler 206, a trace clusterer 208 and trace storage 210. The stream processing platform 202, the span aggregator 204, the adaptive sampler 206 and the trace clusterer 208 may be implemented as software running on one or more computer systems, which may be part of the distributed computer system 100. The trace storage 210 may include one or more computer data storage devices 212, which can be any type of non-volatile storage devices that are commonly used for data storage. As an example, the storage devices 212 may be persistent virtual memory (PVM), non-volatile memory express (NVMe), solid-state devices (SSDs), hard disks or a combination of the four. The trace storage 210 is used to store API execution traces that have been adaptively selected to be sampled. The sampled API execution traces stored in the trace storage 210 can then be used for evaluating and analyzing API failures and performance issues using an analysis tool.

Figure 3:
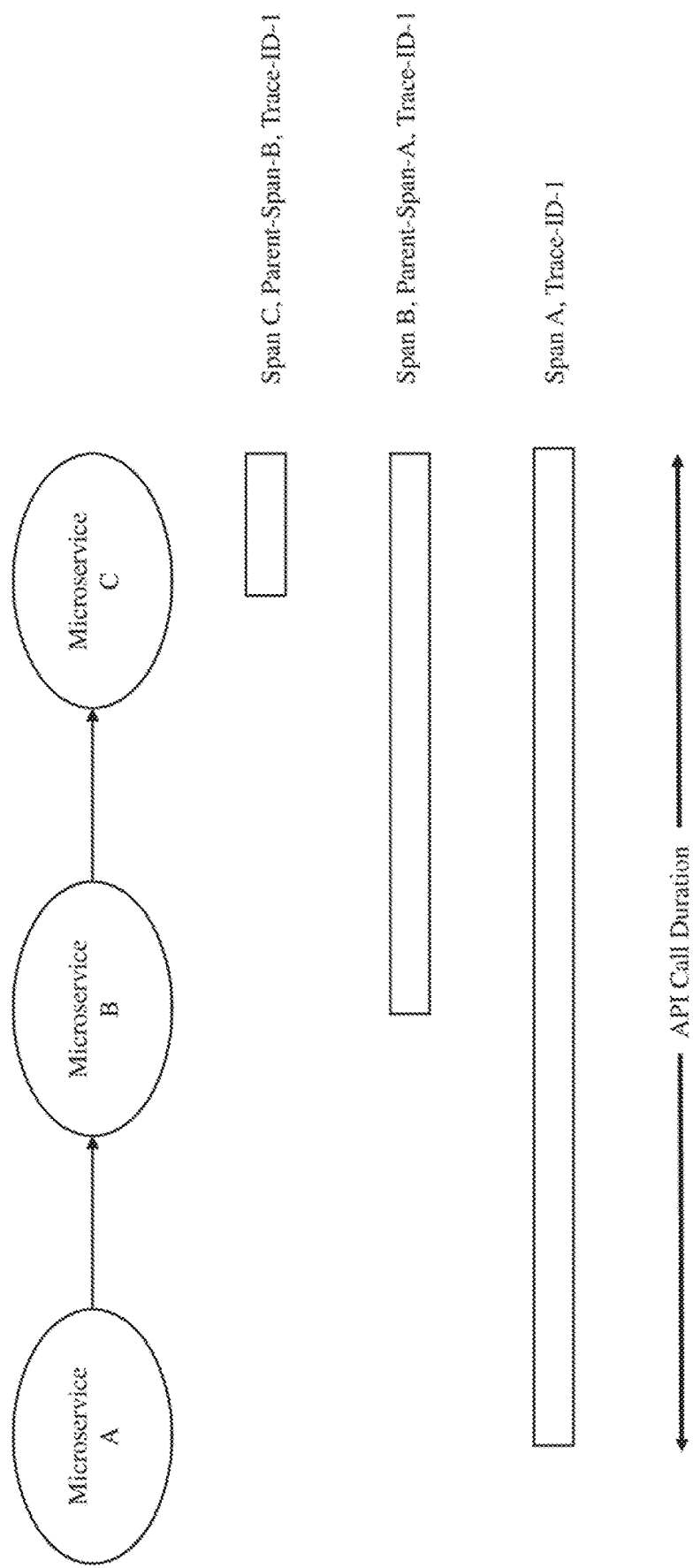
FIG. 3 illustrates spans of an API execution trace using an API execution path through three microservices in accordance with an embodiment of the invention.

The stream process platform 202 of the adaptive trace sampling system 100 operates to receive all the published API-related events from the microservices 102 running in the distributed computer system 104 and processes the API-related events to identify spans and associate information with the spans, which may include span identification (ID), parent span ID and trace ID. As used herein, a span is a unit of an API execution. An API execution trace is an execution path through the system and can be thought of as a directed acyclic graph of spans that are connected through parent span IDs. An example of an API execution path through three microservices A, B and C is shown in FIG. 3 to illustrate spans of an API execution trace. As shown in FIG. 3, the microservice A is the component where an API event originated. The API execution path is from the microservice A to the microservice B and then to the microservice C, which may involve an API call from the microservice A to the microservice B (api/b) and an API call from the microservice B to the microservice C (api/c). As illustrated, there are three spans A, B and C. The span C involves part of the API execution performed by the microservice C. The span C is associated with the parent span ID of Parent-Span-B and the trace ID of Trace-ID-1. The span B involves part of the API execution performed by the microservices B and C. The span B is associated with the parent span ID of Parent-Span-A and the same trace ID of Trace-ID-1. The span A involves part of the API execution performed by the microservices A, B and C. The length of the span A is equal to the API call/execution duration. The span A is associated with only the trace ID of Trace-ID-1. The parent ID is absent for the span A. This property is used in the adaptive trace sampling system 100 to determine if an API execution event has completed.

In an embodiment, the API-related events published by the microservices 102 are span events, each of which is a named, time operation representing a piece of a workflow. Each span event may include an operation name, a start timestamp and finish timestamp, a set of key:value span tags, a set of key:value span logs and a span context. The span tags are key: value pairs that enable annotation of spans. The span logs are key:value pairs for capturing span-specific logging messages and other debugging or information output from the application. The space context carries data across process boundaries, which may be an implementation-dependent state referring to a distinct span within a trace and any baggage items (key:value pairs that cross process boundaries). The following is an example of a span.

```
Operation name: db_query
t=0
t=x
Tags:
 - db.instance:"jdbc:mysql://127.0.0.1:3306/customers
 - db.statement: "SELECT * FROM mytable WHERE foo='bar';"
Logs:
 - message:"Can't connect to mysql server on '127.0.0.1'(10061)"
SpanContext:
 - trace_id:"abc123"
 - span_id:"xyz789"
 - Baggage Items:
    - special_id:"vsid1738"
```

The identified spans and the associated span information are then stored as data in the stream processing platform 202 in a fault-tolerant durable manner so that the stored data can be accessed by the span aggregator 204. To facilitate such access, the stream processing platform 202 includes a query engine so that the stored data can be searched to find specific spans and information associated with those spans. In a particular implementation, the stream processing platform 202 may be an Apache Kafka® platform. In this implementation, the stream processing platform 202 may include a KSQL engine, which is a streaming structured query language (SQL) engine for Apache Kafka® platform.

The span aggregator 204 of the adaptive trace sampling system 100 operates to stitch the individual spans to create API execution traces. This is accomplished by continually executing three sub-steps, which includes (a) span retrieval, (2) matching span retrieval, and (3) trace generation. For the span retrieval sub-step, the span aggregator 204 obtains the next span from the stream processing platform 202 and checks if parent span ID is absent for the span. If so, the span aggregator 204 extracts the trace ID of the span. As noted above, absence of a parent span ID for a span is indicative of the fact that the execution event has completed, and all the spans related to the execution event would be available for consumption. If an Apache Kafka® platform is used, the span is retrieved from a Kafka queue that is being maintained with identified spans in the platform.

For the matching span retrieval sub-step, the span aggregator 204 sends a query to the stream processing platform 202 to obtain all the matching spans with the same trace ID. If an Apache Kafka® platform with a KSQL engine is used, a KSQL query is sent to retrieve all the matching spans with the same trace ID from the Kafka queue.

For the trace generation sub-step, the span aggregator 204 stitches all the matching spans with the same trace ID to generate an API execution trace. The generated API execution trace is then sent to the adaptive sampler 206. Below is an example of a API execution trace that is generated.

```
{
  "data": [
    {
      "traceID": "3b8496f91e044c34",
      "spans": [
        {
          "traceID": "3b8496f91e044c34",
          "spanID": "3b8496f91e044c34",
          "flags": 1,
          "operationName": "/api/traces",
          "references": [ ],
          "startTime ": 1549827709524283,
          "duration": 142,
          "tags": [
            {
              "key": "sampler.type",
              "type": "string",
              "value": "const"
            },
            {
              "key": "sampler.param",
              "type": "bool",
              "value": true
            },
            {
              "key": "span.kind",
              "type": "string",
              "value": "server"
            },
            {
              "key": "http.method",
              "type": "string",
              "value": "GET"
            },
            {
              "key": "http.url",
              "type": "string",
              "value": "/api/traces?end=1549827709522000\u0026limit=20\u0026lookback=1h\u0026maxDuration\u0026minDuration\u0026service=jaeger-query\u0026start=1549824109522000\u0026tags=%7B%22http.status_code%22%3A%22404%22%7D"
            },
            {
              "key": "component",
              "type": "string",
```

```
            "value": "net/http"
          },
          {
            "key": "http.status_code",
            "type": "int64",
            "value": 200
          }
        ],
        "logs": [ ],
        "processID": "p1",
        "warnings": null
      }
    ],
    "processes": {
      "p1": {
        "serviceName": "jaeger-query",
        "tags": [
          {
            "key": "client-uuid",
            "type": "string",
            "value": "6550fb460c8ee430"
          },
          {
            "key": "hostname",
            "type": "string",
            "value": "9f77a41dfd0c"
          },
          {
            "key": "ip",
            "type": "string",
            "value": "172.17.0.2"
          },
          {
            "key": "jaeger.version",
            "type": "string",
            "value": "Go-2.15.1dev"
          }
        ]
      }
    },
    "warnings": null
  }
],
"total": 0,
"limit": 0,
"offset": 0,
"errors": null
}
```

The adaptive sampler 206 of the adaptive trace sampling system 100 operates to receive the API execution traces from the span aggregator 204 and send copies of the API execution traces to the trace clusterer 208, which generates sampling rates for the API execution traces. The adaptive sampler then applies the appropriate sampling rates to the API execution traces based on clustering, which is performed by the trace clusterer 208, as describe below. That is, using the sampling rates provide by the trace clusterer 208 for the API execution traces, the adaptive sampler 206 determines whether to disregard each API execution trace, i.e., not sampled, or to save the API execution trace, i.e., sampled. Thus, the adaptive sampler 206 does not use random sampling, which is the process of selecting a subset of observations randomly from a larger population. Rather, the adaptive sampler 206 uses a sampling rate for each API execution trace that is computed by the trace clusterer 208 to include or not include in a resultant set of sampled API execution traces. The sampling rate for each API execution trace can be anywhere from 0 to 1, where 0 means that the API execution trace would have a probability of 0% of being included in the resultant set of sampled API execution traces and 1 means that the API execution trace would have a probability of 100% of being included in the resultant set of sampled API execution traces.

For the API execution traces that have been determined to be sampled, the adaptive sampler 206 sends those API execution traces to the trace storage 210 to be stored. For the API execution traces that have been determined to be not sampled, the adaptive sampler 206 discards those API execution traces, and thus, are not stored in the trace storage 210.

The trace clusterer 208 of the adaptive trace sampling system 100 operates to categorize the incoming API execution traces into different clusters on their features in a streaming manner. In an embodiment, the trace clusterer 208 ses a density-based clustering algorithm to group the API execution traces into clusters. In addition, the trace clusterer 208 also computes and associates a sampling rate for each cluster of API execution traces. The computed sampling rates are used by the adaptive sampler 206 to sample the incoming API execution traces to increase the probability of capturing meaningful API execution traces, which tends to be the API execution traces that belong to clusters with less density. Based on the sampled API execution traces, the trace clusterer 208 dynamically readjusts the clusters and recomputes the sampling rate for each cluster accordingly.

In an embodiment, the trace clusterer 208 performs tasks to provide the sampling rates, which includes (a) generating feature vectors of API execution traces for clustering, (b)

clustering the API execution traces and (c) computing weighted sampling rates for the clusters. For the task of generating trace features vectors for clustering, the trace clusterer 208 generates a feature vector for an API execution trace by combining various trace-context information from each span of the API execution trace. These trace-context information includes (i) operation of the API execution (HTTP method and HTTP path), (ii) service name, and (iii) list of span hostname, span duration and span status code for each span in the sequence of execution flow for the API execution trace. The operation method is the type of API requests that are sent to a server, e.g., GET, PUT, POST, DELETE, etc. The operation path is the whole path (series of API calls) that are part of the operation, e.g., api1/v2/search-something/ . . . . The service name is the name of the service that is called at the beginning (i.e., the original call). The span hostname is the reachable IP of the service that is part of the call. The span duration is the time difference between the final call and the first call in a span. The span status code is a code that is returned after a span ends, such as 504, 404, 503, etc.

In an embodiment, the trace-context information used to generate the trace feature vectors may vary depending on a source tracing system being used by the adaptive trace sampling system 100. An example of a trace feature vector 400 for an API execution trace for a Jaeger tracing system is illustrated in FIG. 4. As shown in FIG. 4, the trace feature vector 400 of an API execution trace includes an operation method, an operation path, a service name, a span-1 hostname, a span-1 duration, a span-1 status code, a span-2 hostname, and so on for all the spans in the API execution trace.

For the task of clustering the API execution traces, the trace clusterer 208 converts each incoming API execution trace to a corresponding feature vector based on the respective schema of tracing system being used. The trace clusterer 208 maintains a list of feature vectors (also referred to herein as datapoints) corresponding to the 'N' recent sampled spans in a queue data structure, where 'N' is a configurable parameter with the default value of 1000. The data points available in the queue are used by the trace clusterer 208 to generate clusters using a clustering algorithm. In an embodiment, the trace clusterer 208 uses a Density-Based Spatial Clustering of Applications with Noise (DBSCAN) algorithm, which aims at grouping datapoints based upon density parameters (Euclidean distance between datapoints and the number of points in a neighborhood). The datapoints that are close enough based on the trace feature vectors are considered part of the same cluster. The result of the DBSCAN algorithm is a set of clusters with the corresponding cardinality values, where each cardinality value of a cluster denotes the number of datapoints that belong to that cluster. The result of a 2-dimensional DBSCAN clustering can be visualized in a 2-dimension graph. However, such visualization does not correspond to the actual clustered data, since the trace feature vectors used by the trace clusterer have more than six (6) dimensions (since all API execution traces will have at least one span information), which is very hard to visualize in 2 or 3 dimensions.

For the task of computing weighted sampling rates for the clusters, the trace clusterer 208 determines the sampling rate for each of the clusters by computing normalized inverse weightage, which assigns a higher sampling rate to the clusters with lower density while ensuring maximum sampling rate of 1. The equation for sampling rate of cluster 'C' is defined as:

$$S_C = (W_{Max} - W_{Min}) * \frac{1/N_C}{\sum_{i=0}^{K} \frac{1}{N_i}} + 1,$$

where, $N_C$ corresponds to the cardinality of the cluster C and K corresponds to the total number of discovered clusters. The terms $W_{Max}$ and $W_{Min}$ are configurable parameters that denote the allowable range for generated sampling rates. These range parameters ensure that the adaptive sampling has no additional storage overhead on the trace storage 210. The above equation for adaptive sampling rate always assigns higher sampling rates to clusters with fewer number of datapoints and lower sampling rates to clusters with larger number of datapoints, which ensures that the distribution of the resultant sampled set is more uniform.

Figure 5A:
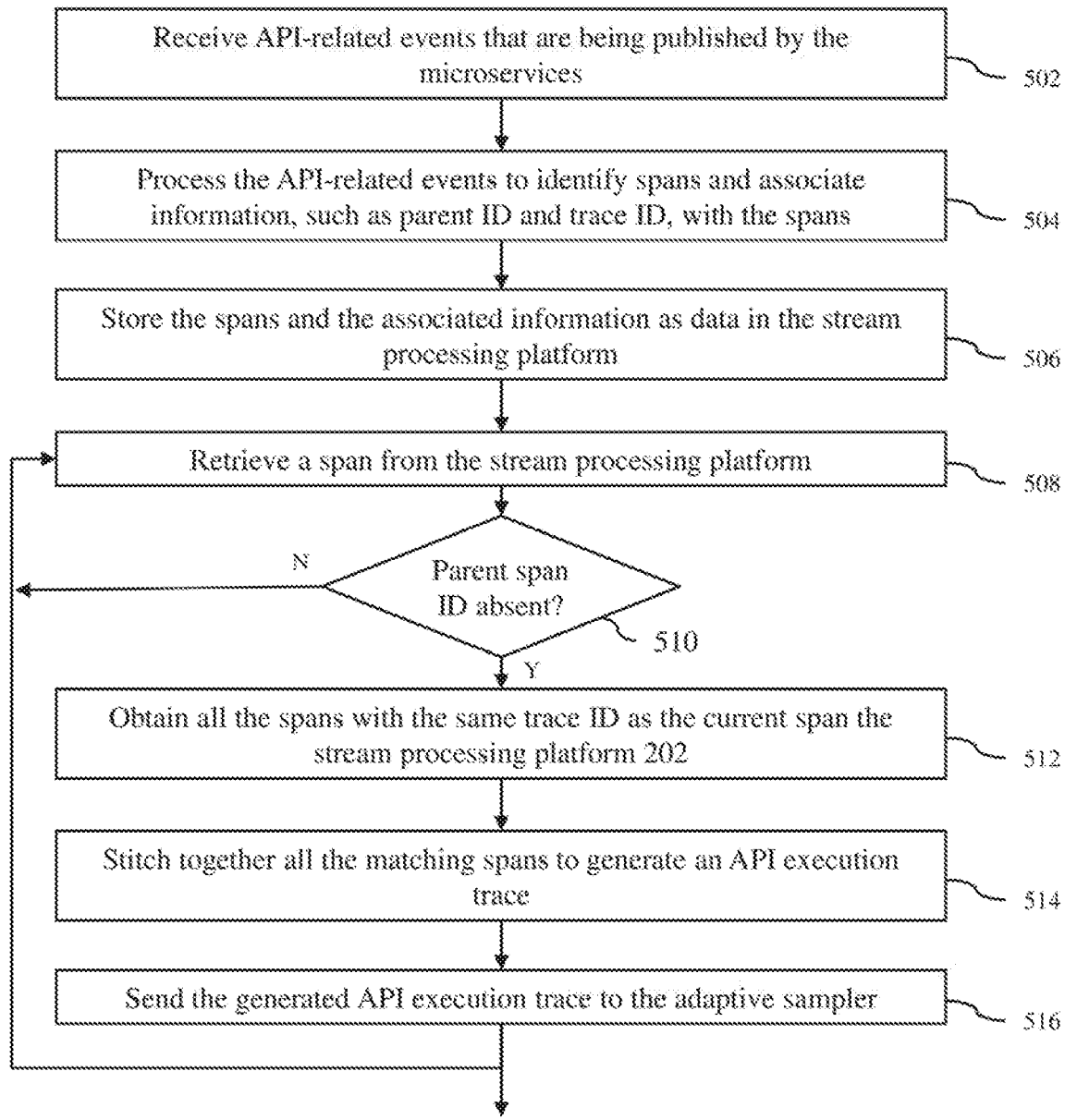
FIGS. 5A and 5B is a process flow diagram of the operation of the adaptive trace sampling system in accordance with an embodiment of the invention.
Figure 5B:
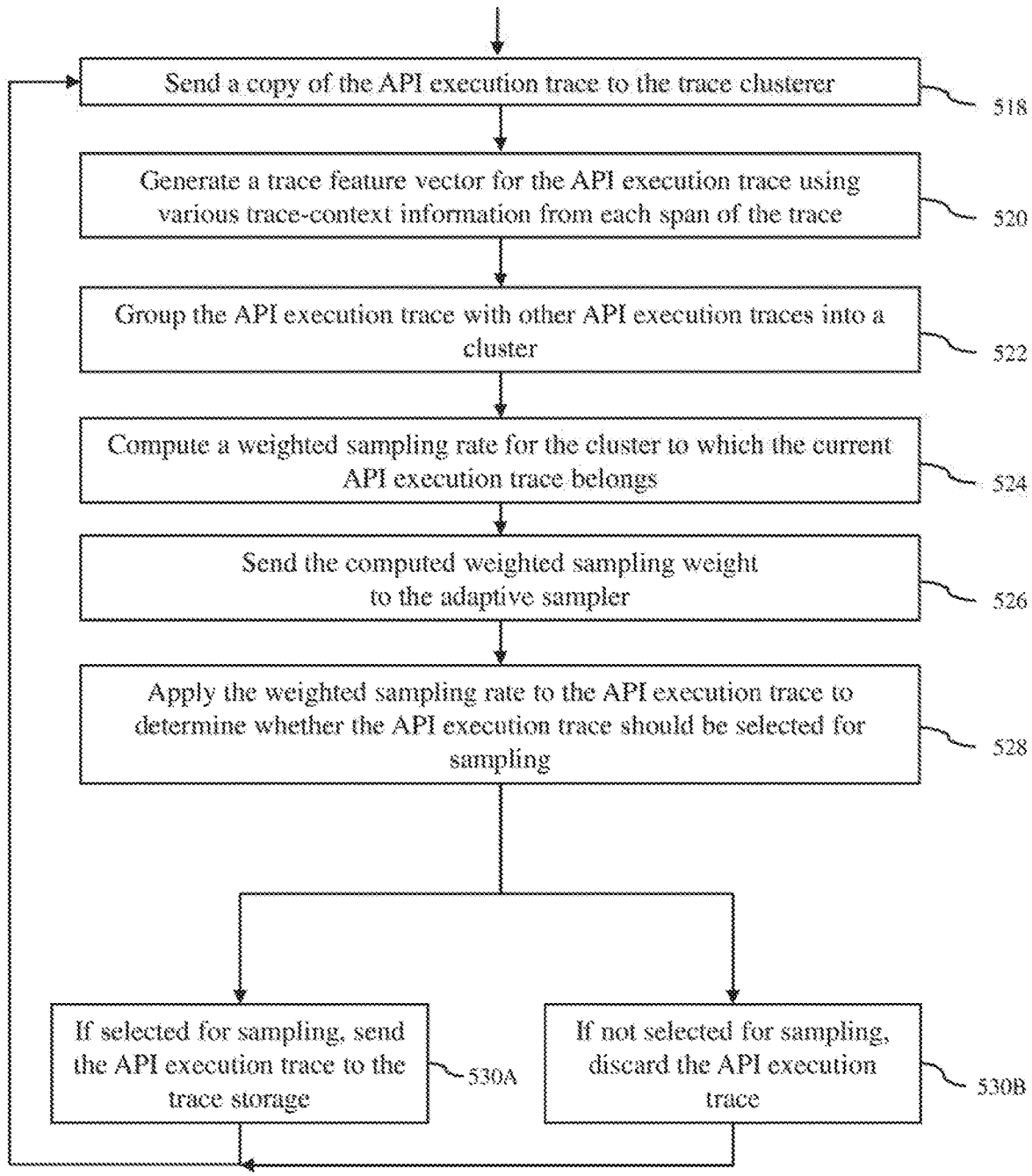

The operation of the adaptive trace sampling system 100 in accordance with an embodiment of the invention is described with reference to a flow diagram of FIGS. 5A and 5B. The operation begins at block 502, where the stream processing platform 202 receives API-related events that are being published by the microservices 102 running on the distributed computer system 104. Next, at block 504, the API-related events are processed by the stream processing platform 202 to identify spans and associate information, such as parent ID and trace ID, with the spans. Next, at block 506, the spans and the associated information are stored as data in the stream processing platform 202.

Next, at block 508, a span is retrieved from the stream processing platform 202 by the span aggregator 204. Next, at block 510, a determination is made by the span aggregator whether a parent span ID is absent for the span. If no, then the operation proceeds back to block 508 to retrieve the next span from the stream processing platform 202. If yes, then the operation proceeds to block 512, where all the spans with the same trace ID as the current span are obtained from the stream processing platform 202. In an embodiment, the span aggregator sends a KSQL query to the stream processing platform, which is the Apache Kafka® platform, to obtain all the matching spans with the same trace ID.

Next, at block 514, all the matching spans are stitched together by the span aggregator 204 to generate an API execution trace. Next, at block 516, the generated API execution trace is sent to the adaptive sampler 206 from the span aggregator 204. The operation then proceeds to block 518. In addition, the operation also proceeds to block 508 so that new spans are continuously processed by the span aggregator 204.

At block 518, a copy of the API execution trace is sent to the trace clusterer 208 from the adaptive sampler 206. Next, at block 520, a trace feature vector for the API execution trace is generated by the trace clusterer 208 using trace-context information from each span of the API execution trace. In an embodiment, the trace feature vector of the API execution trace may include an operation method, an operation path, a service name, and a span hostname, a span duration, and a span status code for each span in the API execution trace, as illustrated in FIG. 4.

Next, at block 522, the API execution trace is grouped with other API execution traces into a cluster by the trace clusterer 208. In an embodiment, the trace clusterer 208 uses a DBSCAN algorithm for clustering API execution traces. Next, at block 524, a weighted sampling rate is computed by the trace clusterer 208 for the cluster to which the current API execution trace belongs. In an embodiment, the trace clusterer 208 computes a normalized inverse weightage to derive the weighted sampling rate.

Next, at block 526, the computed weighted sampling weight is sent to the adaptive sampler 206 from the trace clusterer 208. Next, at block 528, the weighted sampling weight is applied to the API execution trace by the adaptive sampler 206 to determine whether the API execution trace should be selected for sampling. Next, at block 530A, if the API execution trace is selected for sampling, the API execution traces is sent to the trace storage 210 by the adaptive sampler 206 to be persisted in the trace storage. Alternatively, at block 530B, if the API execution trace is not selected for sampling, the API execution traces is discarded by the adaptive sampler 206. The operation then proceeds back to block 518, where the next API execution trace from the span aggregator 204 is processed and sampled or discarded using the sampling rate computed by the trace clusterer 208 for the cluster to which that next API execution trace belongs.

In this manner, a small percentage of API execution traces are selectively sampled. However, since higher sampling rates are used to sample API execution traces that belong to clusters with lower densities, more unusual and interesting API execution traces are captured. These unusual and interest API execution traces provide meaningful information for evaluating and analyzing API failures and performance issues.

Figure 6:
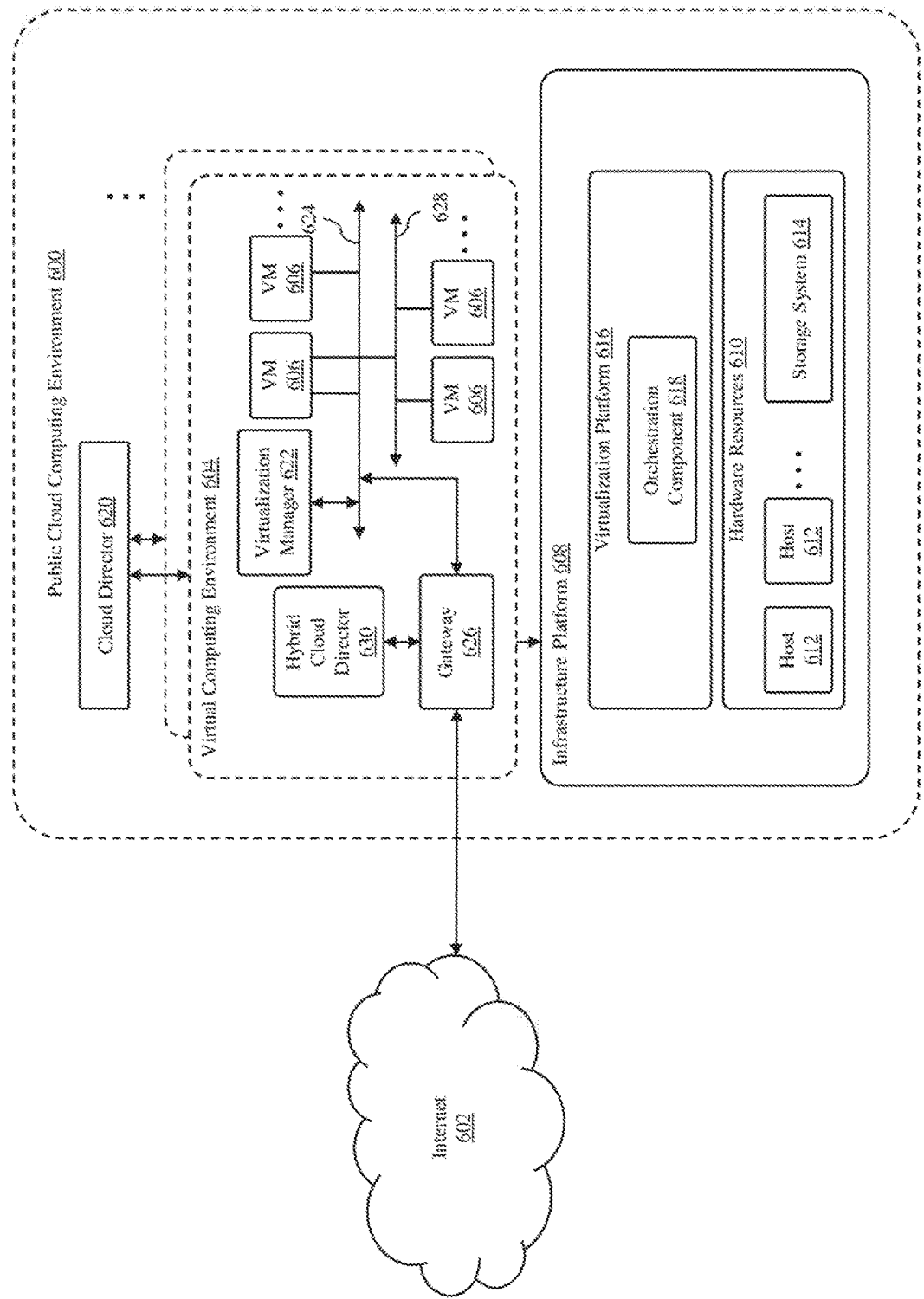
FIG. 6 is a block diagram of a public cloud computing environment in which the microservices and the adaptive trace sampling system can be implemented in accordance with an embodiment of the invention.

Turning now to FIG. 6, a block diagram of a public cloud computing environment 600 that can be used to implement the microservices 102 and the adaptive trace sampling system 100 in accordance with an embodiment of the invention is shown. The public cloud computing environment 600 may be operated by a cloud computing service provider and exposed as a service available to account holders, such as enterprises, which can be access via the Internet 602.

The public cloud computing environment 600 is configured to dynamically provide an enterprise (or users of an enterprise) with physical resources to execute microservices based applications. These resources may be provided using one or more virtual computing environments 604 in which virtual machines (VMs) 606 are running to execute the microservices based applications. The public cloud computing environment 600 includes an infrastructure platform 608 upon which the virtual computing environments can be executed. In the particular embodiment of FIG. 6, the infrastructure platform 608 includes hardware resources 610 having computing resources (e.g., host computers 612), storage resources (e.g., one or more storage systems 614, such as a storage area network (SAN)), and networking resources (not illustrated), and a virtualization platform 616, which is programmed and/or configured to provide the virtual computing environments 604 that support the virtual machines 406 running in the host computers 612. The virtualization platform 616 may be implemented using one or more software programs that reside and execute in one or more computer systems, such as the host computers 612, or in one or more virtual machines 606 running on the host computers.

In one embodiment, the virtualization platform 616 includes an orchestration component 618 that provides infrastructure resources to the virtual computing environments 604 responsive to provisioning requests. The orchestration component may instantiate virtual machines according to a requested template that defines one or more virtual machines having specified virtual computing resources (e.g., compute, networking and storage resources). Further, the orchestration component 618 may monitor the infrastructure resource consumption levels and requirements of the virtual computing environments 604 and provide additional infrastructure resources to the virtual computing environments as needed or desired. In one example, the virtualization platform 616 may be implemented by running on the hosts 612 VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 600.

In one embodiment, the public cloud computing environment 600 may include a cloud director 620 that manages allocation of virtual computing resources to an enterprise. The cloud director may be accessible to users via a REST API or any other client-server communication protocol. The cloud director may authenticate connection attempts from the enterprise using credentials issued by the cloud computing provider. The cloud director receives provisioning requests submitted (e.g., via REST API calls) and may propagate such requests to the orchestration component 618 to instantiate the virtual machines (e.g., the virtual machines 606) as needed. One example of the cloud director is the VMware vCloud Director® product from VMware, Inc. The public cloud computing environment 600 may be VMware cloud (VMC) on Amazon Web Services (AWS).

In one embodiment, at least some of the virtual computing environments 604 may be configured as virtual data centers. Each virtual computing environment includes one or more virtual computing instances, such as the virtual machines 606, and one or more virtualization managers 622. One example of the virtualization manager 622 is the VMware vCenter Server® product made available from VMware, Inc. Each virtual computing environment may further include one or more virtual networks 624 used to communicate between the virtual machines 606 running in that environment and managed by at least one networking gateway device 626, as well as one or more isolated internal networks 628 not connected to the gateway device 626. The gateway device 626, which may be a virtual appliance, is configured to provide the virtual machines 606 and other components in the virtual computing environment 604 with connectivity to external devices.

In one embodiment, each virtual computing environments 604 includes a hybrid cloud director 630 configured to communicate with a corresponding hybrid cloud manager in a private cloud computing environment (not shown) to enable a common virtualized computing platform between the private and public cloud computing environments. The hybrid cloud director may communicate with the hybrid cloud manager in the private cloud computing environment using Internet-based traffic via a VPN tunnel established through the gateway. As an example, the hybrid cloud director 630 may be a component of the HCX-Cloud product, which is provided by VMware, Inc.

Although embodiments of the invention have been described with respect to API execution paths through microservices, the embodiments of the invention may be applied to API execution paths through serverless functions that run in a distributed computer system, such as the public cloud computing environment 600. As used herein, it is assumed that microservices include serverless functions.

Figure 7:
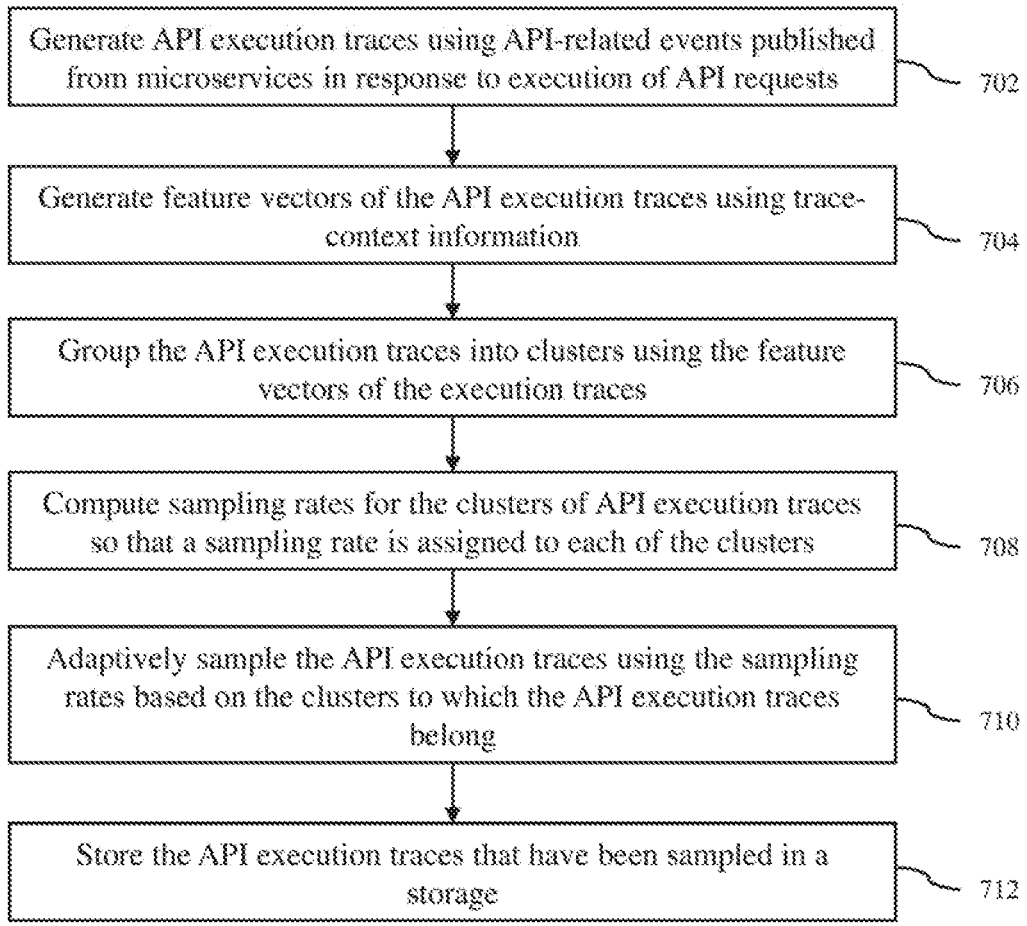
FIG. 7 is a flow diagram of a computer-implemented method for sampling API execution traces in accordance with an embodiment of the invention.

A computer-implemented method for sampling application programming interface (API) execution traces in accordance with an embodiment of the invention is described with reference to a flow diagram of FIG. 7. At block 702, the API execution traces are generated using API-related events published from microservices in response to execution of API requests. At block 704, feature vectors of the API execution traces are generated using trace-context information. At block 706, the API execution traces are grouped into clusters using the feature vectors of the API execution traces.

At block 708, sampling rates for the clusters of API execution traces are computed so that a unique sampling rate is assigned to each of the clusters. At block 710, the API execution traces are adaptively sampled using the sampling rates based on the clusters to which the API execution traces belong. At block 712, the API execution traces that have been sampled are stored in a storage.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for sampling application programming interface (API) execution traces, the method comprising:
   generating the API execution traces using API-related events published from microservices in response to execution of API requests, wherein each API execution trace of at least some of the API execution traces comprises multiple spans of a particular API execution associated with some of the microservices that are stitched together to form the API execution trace;
   generating feature vectors of the API execution traces using trace-context information;
   grouping the API execution traces into clusters using the feature vectors of the API execution traces;
   computing sampling rates for the clusters of the API execution traces so that a sampling rate is assigned to each of the clusters, wherein an equation based on a cardinality of each of the clusters of the API execution traces and an allowable range for the sampling rates is used to compute each of the sampling rates for the clusters of the API execution traces;
   adaptively sampling the API execution traces using the sampling rates based on the clusters to which the API execution traces belong, including selectively storing and discarding the API execution traces based on the sampling rates; and
   storing the API execution traces that have been sampled in a storage.

2. The method of claim 1, wherein grouping the API execution traces into the clusters includes using a density-based clustering algorithm to form the clusters.

3. The method of claim 2, wherein the density-based clustering algorithm is a Density-Based Spatial Clustering of Applications with Noise (DBSCAN) algorithm.

4. The method of claim 1, wherein computing the sampling rates for the clusters of the API execution traces includes computing the sampling rates for the clusters of the API execution traces such that the clusters with higher densities of the API execution traces have lower sampling rates than the clusters with lower densities of the API execution traces.

5. The method of claim 4, wherein computing the sampling rates for the clusters of the API execution traces includes using the following equation to compute a sampling rate for a cluster C:

$$S_C = (W_{Max} - W_{Min}) * \frac{1/N_C}{\sum_{i=0}^{K} \frac{1}{N_i}} + 1,$$

where $S_C$ is the sampling rate for the cluster C, $N_C$ corresponds to the cardinality of the cluster C, K corresponds to a total number of discovered clusters, and terms $W_{Max}$ and $W_{Min}$ are configurable parameters that denote the allowable range for generated sampling rates.

6. The method of claim 1, wherein each of the feature vectors of the API execution traces include an operation method, an operation path, a service name and information regarding spans of the respective API execution trace.

7. The method of claim 1, wherein generating the API execution traces using the API-related events includes identifying a particular span with a trace identification (ID) that has no parent span ID and obtaining all spans with the same trace ID as the particular span to generate an API execution trace.

8. A non-transitory computer-readable storage medium containing program instructions for method for sampling application programming interface (API) execution traces in a computer system, wherein execution of the program instructions by one or more processors of a computer causes the one or more processors to perform steps comprising:
   generating the API execution traces using API-related events published from microservices in response to execution of API requests, wherein each API execution trace of at least some of the API execution traces comprises multiple spans of a particular API execution associated with some of the microservices that are stitched together to form the API execution trace;

generating feature vectors of the API execution traces using trace-context information;

grouping the API execution traces into clusters using the feature vectors of the API execution traces;

computing sampling rates for the clusters of the API execution traces so that a sampling rate is assigned to each of the clusters, wherein an equation based on a cardinality of each of the clusters of the API execution traces and an allowable range for the sampling rates is used to compute each of the sampling rates for the clusters of the API execution traces;

adaptively sampling the API execution traces using the sampling rates based on the clusters to which the API execution traces belong, including selectively storing and discarding the API execution traces based on the sampling rates; and storing the API execution traces that have been sampled in a storage.

9. The computer-readable storage medium of claim 8, wherein grouping the API execution traces into the clusters includes using a density-based clustering algorithm to form the clusters.

10. The computer-readable storage medium of claim 9, wherein the density-based clustering algorithm is a Density-Based Spatial Clustering of Applications with Noise (DBSCAN) algorithm.

11. The computer-readable storage medium of claim 8, wherein computing the sampling rates for the clusters of the API execution traces includes computing the sampling rates for the clusters of the API execution traces such that the clusters with higher densities of the API execution traces have lower sampling rates than the clusters with lower densities of the API execution traces.

12. The computer-readable storage medium of claim 11, wherein computing the sampling rates for the clusters of the API execution traces includes using the following equation to compute a sampling rate for a cluster C:

$$S_C = (W_{Max} - W_{Min}) * \frac{1/N_C}{\sum_{i=0}^{K} \frac{1}{N_i}} + 1,$$

where $S_C$ is the sampling rate for the cluster C, $N_C$ corresponds to the cardinality of the cluster C, K corresponds to a total number of discovered clusters, and terms $W_{Max}$ and $W_{Min}$ are configurable parameters that denote the allowable range for generated sampling rates.

13. The computer-readable storage medium of claim 8, wherein each of the feature vectors of the API execution traces include an operation method, an operation path, a service name and information regarding spans of the respective API execution trace.

14. The computer-readable storage medium of claim 8, wherein generating the API execution traces using the API-related events includes identifying a particular span with a trace identification (ID) that has no parent span ID and obtaining all spans with the same trace ID as the particular span to generate an API execution trace.

15. A system comprising:
memory; and
at least one processor configured to:
generate API execution traces using API-related events published from microservices in response to execution of API requests, wherein each API execution trace of at least some of the API execution traces comprises multiple spans of a particular API execution associated with some of the microservices that are stitched together to form the API execution trace;
generate feature vectors of the API execution traces using trace-context information;
group the API execution traces into clusters using the feature vectors of the API execution traces;
compute sampling rates for the clusters of the API execution traces so that a sampling rate is assigned to each of the clusters, wherein an equation based on a cardinality of each of the clusters of the API execution traces and an allowable range for the sampling rates is used to compute each of the sampling rates for the clusters of the API execution traces;
adaptively sample the API execution traces using the sampling rates based on the clusters to which the API execution traces belong, including selectively storing and discarding the API execution traces based on the sampling rates; and
store the API execution traces that have been sampled in a storage.

16. The system of claim 15, wherein the at least one processor is configured to use a density-based clustering algorithm to form the clusters.

17. The system of claim 16, wherein the density-based clustering algorithm is a Density-Based Spatial Clustering of Applications with Noise (DBSCAN) algorithm.

18. The system of claim 15, wherein the at least one processor is configured to compute the sampling rates for the clusters of the API execution traces such that the clusters with higher densities of the API execution traces have lower sampling rates than the clusters with lower densities of the API execution traces.

19. The system of claim 18, wherein the at least one processor is configured to use the following equation to compute a sampling rate for a cluster C:

$$S_C = (W_{Max} - W_{Min}) * \frac{1/N_C}{\sum_{i=0}^{K} \frac{1}{N_i}} + 1,$$

where $S_C$ is the sampling rate for the cluster C, $N_C$ corresponds to the cardinality of the cluster C, K corresponds to a total number of discovered clusters, and terms $W_{Max}$ and $W_{Min}$ are configurable parameters that denote the allowable range for generated sampling rates.

20. The system of claim 15, wherein the equation includes a fraction that has a numerator based on a cardinality of a particular cluster of the API execution traces and a denominator based on cardinalities of all the clusters of the API execution traces.

* * * * *